(12) United States Patent
Mikaelsen et al.

(10) Patent No.: US 9,242,318 B2
(45) Date of Patent: Jan. 26, 2016

(54) ANGLE METER STOP GUARD

(75) Inventors: Mark Mikaelsen, Las Vegas, NV (US); Joel Murphy, Las Vegas, NV (US)

(73) Assignee: Las Vegas Valley Water District, Las Vegas, NV (US)

( * ) Notice: Subject to any disclaimer, the term of this patent is extended or adjusted under 35 U.S.C. 154(b) by 720 days.

(21) Appl. No.: 13/541,004

(22) Filed: Jul. 3, 2012

(65) Prior Publication Data

US 2014/0007948 A1 Jan. 9, 2014

(51) Int. Cl.
| | |
|---|---|
| G01F 15/00 | (2006.01) |
| F16K 35/00 | (2006.01) |
| B23P 17/04 | (2006.01) |
| G01F 1/00 | (2006.01) |
| F17D 5/00 | (2006.01) |

(52) U.S. Cl.
CPC . B23P 17/04 (2013.01); F17D 5/00 (2013.01); G01F 1/00 (2013.01); G01F 15/00 (2013.01); Y10T 29/49826 (2015.01); Y10T 137/0413 (2015.04); Y10T 137/7043 (2015.04); Y10T 137/7062 (2015.04)

(58) Field of Classification Search
USPC ........... 137/363–373, 377, 382, 382.5, 15.01, 137/15.03; 73/201; 248/351
See application file for complete search history.

(56) References Cited

U.S. PATENT DOCUMENTS

| | | | | | |
|---|---|---|---|---|---|
| 1,903,581 | A | * | 4/1933 | Turner | 70/178 |
| 3,891,181 | A | * | 6/1975 | Sanders | 251/128 |
| 3,961,528 | A | * | 6/1976 | Ford | 73/201 |
| 4,064,902 | A | * | 12/1977 | Swenson | 137/370 |
| 4,856,124 | A | * | 8/1989 | McJunkin | 4/496 |
| 5,240,032 | A | * | 8/1993 | Mizioch | 137/368 |
| 5,393,251 | A | * | 2/1995 | Gilbert | 440/59 |
| 5,727,767 | A | * | 3/1998 | Jefrey | 248/354.3 |
| 5,971,362 | A | * | 10/1999 | Clark | 254/100 |
| 2009/0020242 | A1 | * | 1/2009 | Muhlebach | 160/376 |

* cited by examiner

Primary Examiner — Kevin Murphy
Assistant Examiner — Jonathan Waddy
(74) Attorney, Agent, or Firm — Klarquist Sparkman, LLP

(57) ABSTRACT

An exemplary safety device can comprise a guard coupled to a lower end of a support shaft and two arms coupled to the support shaft configured to engage with the inner walls of the meter box. The arms can be adjustable to change the distance they extend from the support shaft, such as by rotating the arms about a central bolt that is fixed relative to the shaft. The arms can have end caps that are configured to contact the inner walls of the meter box to create a frictional resistance holding the device securely within the meter box. The arms can be coupled to the support shaft with an adapter ring that is adjustable along the support shaft to change the vertical position of the arms. The guard can partially surround the angle meter stop and can contain it if it blows off the pipe below it.

20 Claims, 6 Drawing Sheets

ANGLE METER STOP GUARD

FIELD

This disclosure relates to safety devices for use with water meter assemblies.

BACKGROUND

Typical water meter assemblies comprise a series of plumbing elements positioned within a meter box. The plumbing includes a water meter coupled to an angle meter stop (sometimes also referred to as an "angle meter valve"). The angle meter stop includes a valve and is typically positioned adjacent to the water meter toward one end of the meter box. The angle meter stop forms a 90° downward bend, with a horizontal portion coupled to the water meter and vertical portion coupled to a downwardly extending vertical conduit that connects with a water main or water source. The vertical portion of the angle meter stop is typically attached to the downwardly extending vertical conduit using a "grip-tite" friction fit.

Periodically, maintenance needs to be performed on the plumbing elements of the water meter assembly. For example, the water meter may need to be replaced every 15 years. To replace the water meter, the valve of the angle meter stop is first closed and the old water meter disconnected from the angle meter stop. A new water meter is then installed. With the valve closed, the water pressure in the vertical portion of the valve can exert a strong upward force on the angle meter stop. Without the water meter connection holding the angle meter stop in place, the only force holding the angle meter stop to the vertical conduit is the "grip-tite" friction fit. If the friction fit is not properly formed, or the friction fit fails for any reason, the water pressure can cause the angle meter stop to violently blow off from the vertical conduit and injure a person performing maintenance.

SUMMARY

Disclosed herein are embodiments of a safety device that can be installed in a water meter box to block the angle meter stop in case it comes loose from the adjacent plumbing. In one exemplary embodiment, the safety device comprises a guard portion coupled to a lower end of a support shaft and two arms coupled to the support shaft that are configured to engage with the inner walls of the meter box. The arms can be adjustable to change the distance they extend from the support shaft (e.g., by rotating the arms about a central bolt that is fixed relative to the shaft). The arms can have end caps (e.g., rubber end caps) that are configured to contact the inner walls of the meter box when the device is installed to create a frictional resistance holding the device securely within the meter box. The arms can be coupled to the support shaft with an adapter ring. The ring can be adjustable up and down the support shaft to change the position of the arms along the longitudinal axis of the support shaft. The guard can partially surround the angle meter stop and can be strong enough to contain the angle meter stop if it violently blows off from the pipe below it under high water pressure. The guard can comprise a cut out or notch in one side wall to accommodate a horizontal conduit connection between the angle meter stop and the water meter.

In use, the safety device can be inserted into the meter box with the arms in a contracted, or radially shortened, position. When the guard is positioned over the angle meter stop, the arms can be adjusted radially outwardly until the end caps contact the side walls of the meter box. The arms can be manually rotated to tighten them firmly against the side walls of the meter box to install the safety device. After work on the water meter is completed, the arms can be rotated back the other direction to loosen the end caps from the walls, and the device can be lifted off of the angle meter stop and out of the meter box.

The foregoing and other objects, features, and advantages of the disclosed embodiments will become more apparent from the following detailed description, which proceeds with reference to the accompanying figures.

DETAILED DESCRIPTION

The disclosed safety devices can be installed in a water meter assembly to prevent injury in case an angle meter stop comes loose while work is being performed on a water meter and/or other plumbing elements within the meter box.

Figure 1:
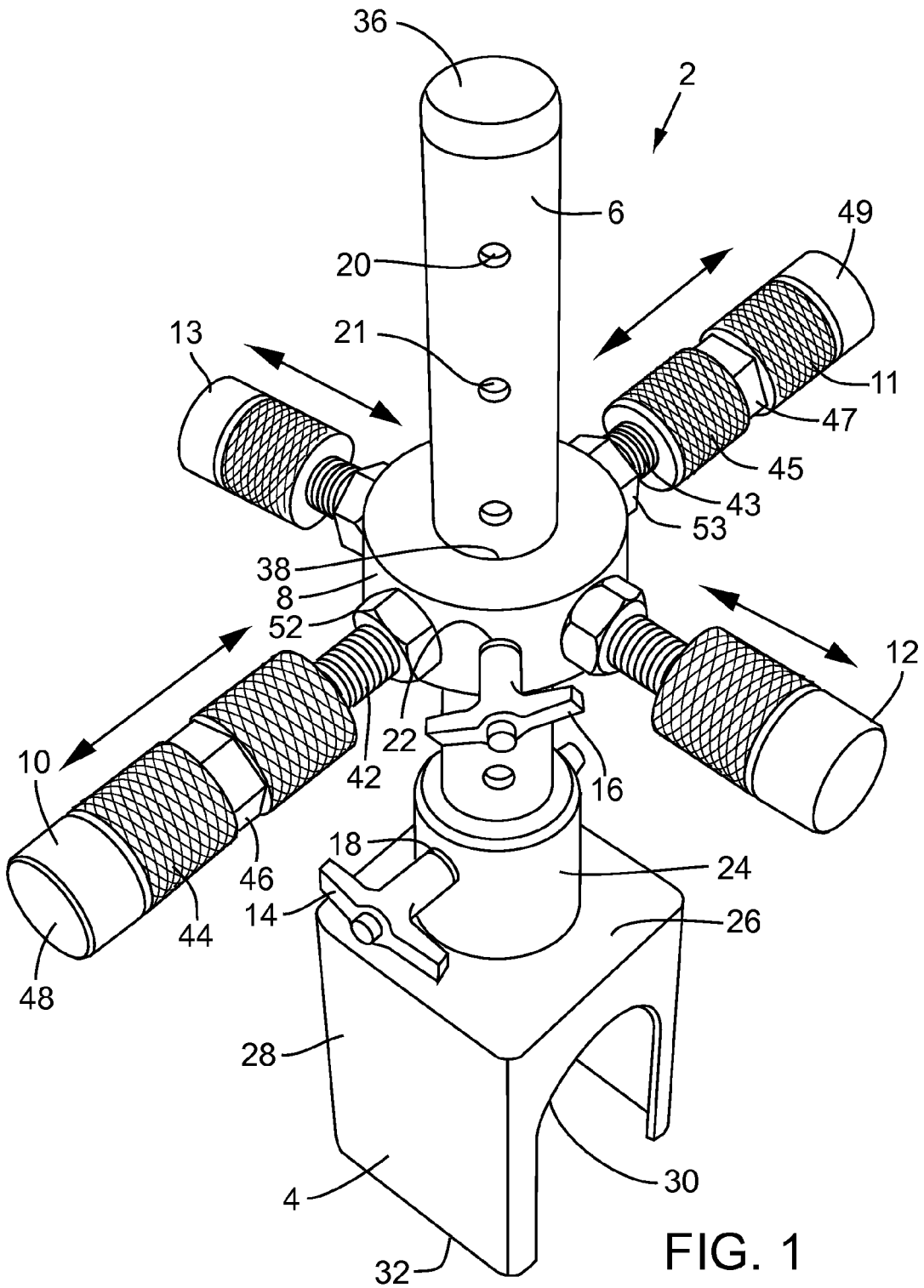
FIG. 1 is a perspective view of an exemplary safety device comprising a guard, a support shaft, an adapter ring, and two sets of different length arms.
Figure 2:
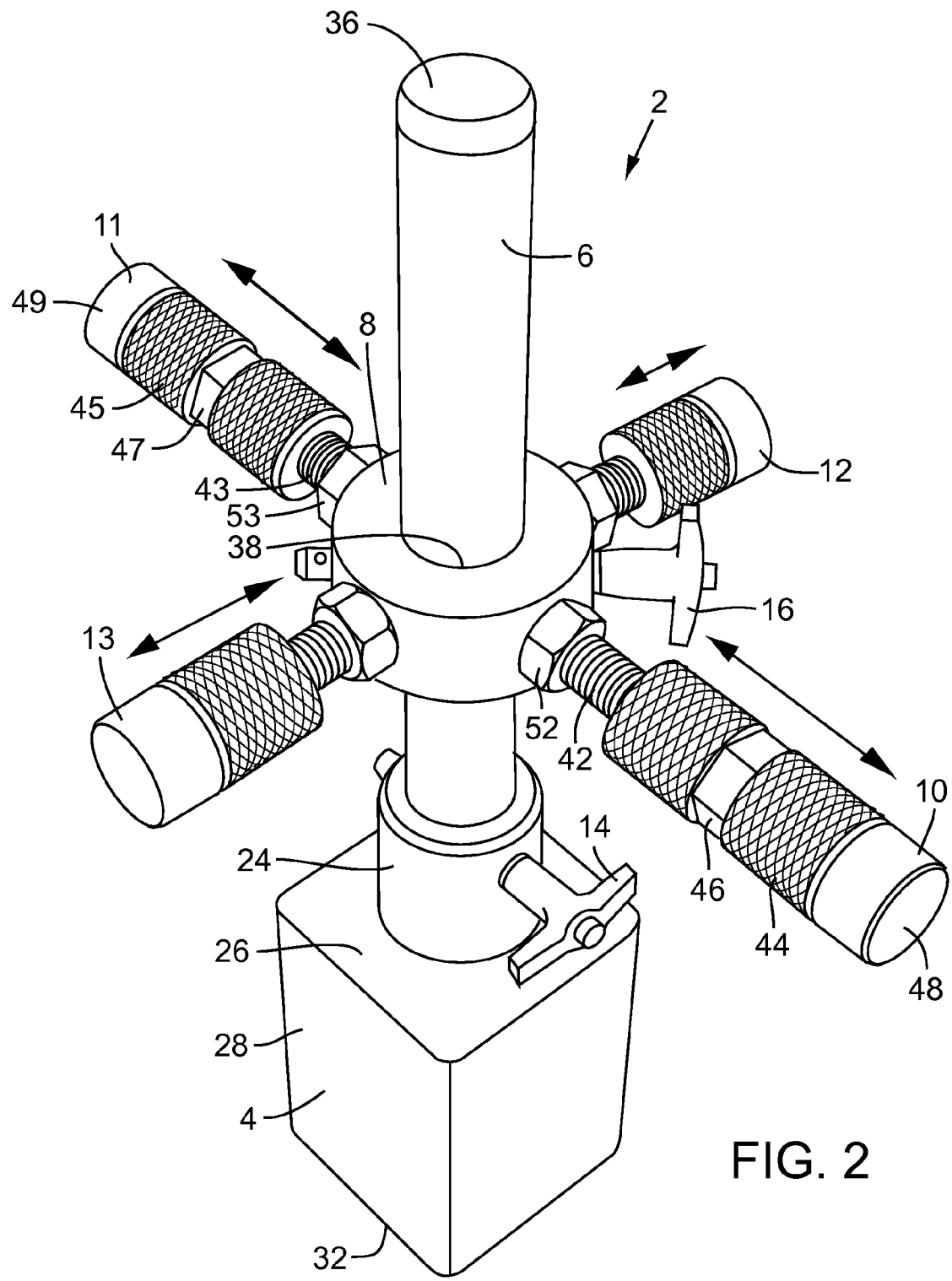
FIG. 2 is another perspective view of the safety device of FIG. 1.

An exemplary safety device 2 is shown in FIGS. 1 and 2. The device 2 comprises a guard 4, a support shaft 6, and arms 10, 11, 12, 13. The device is shown with two long arms 10, 11 and two short arms 12, 13 present in FIGS. 1 and 2 for illustrative purposes, though only two or three arms are present in some embodiments. The arms 10, 11, 12, 13 can be coupled to the support shaft 6 with an adapter ring 8. The two long arms 10, 11 extend in opposite directions from adjacent the support shaft 6 along a common arm axis that is generally perpendicular with the support shaft. Similarly, the two short arms 12, 13 also extend in opposite directions from adjacent the support shaft 6 along a common arm axis that is generally perpendicular with the support shaft. The arms 10, 11, 12, 13 are configured to engage with opposing side walls 104 of a meter box 102 that are generally perpendicular with the arms, as shown in FIGS. 6 and 7.

Figure 5:
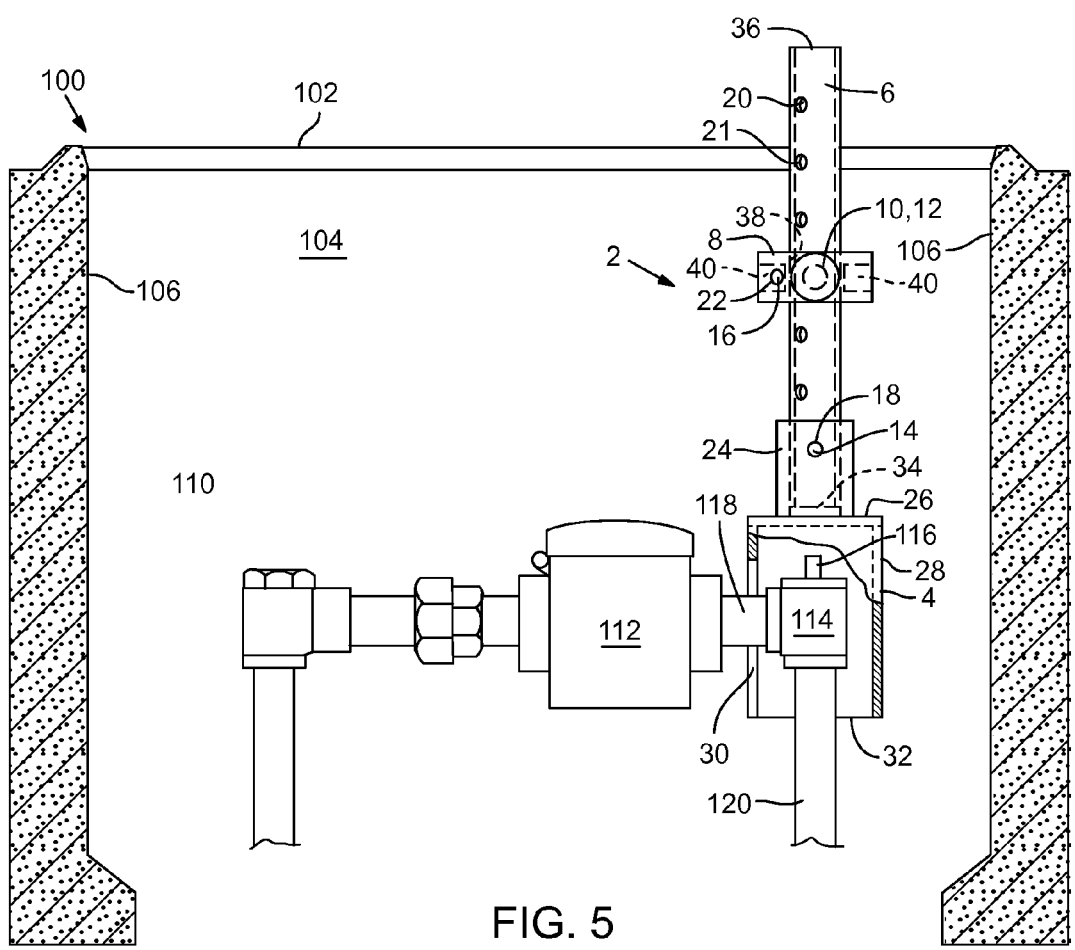
FIG. 5 is a partial cross-sectional side view of a water meter assembly with the safety device of FIG. 1 installed therein and with two of the arms removed and the guard partially cut away.
Figure 6:
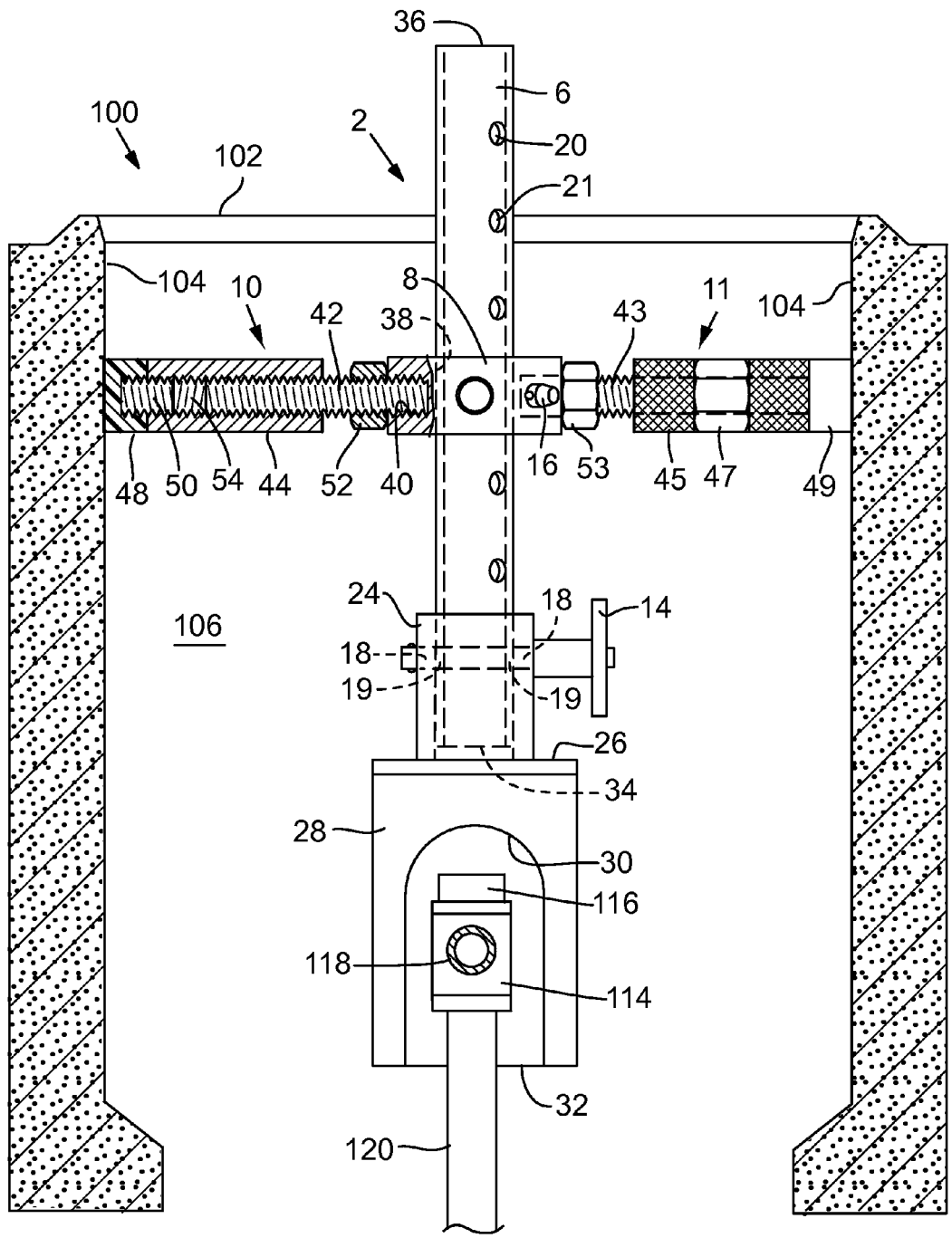
FIGS. 6 and 7 are partial cross-sectional end views of the water meter assembly of FIG. 5 with the safety device of FIG. 1 installed therein and with two of the arms removed.
Figure 7:
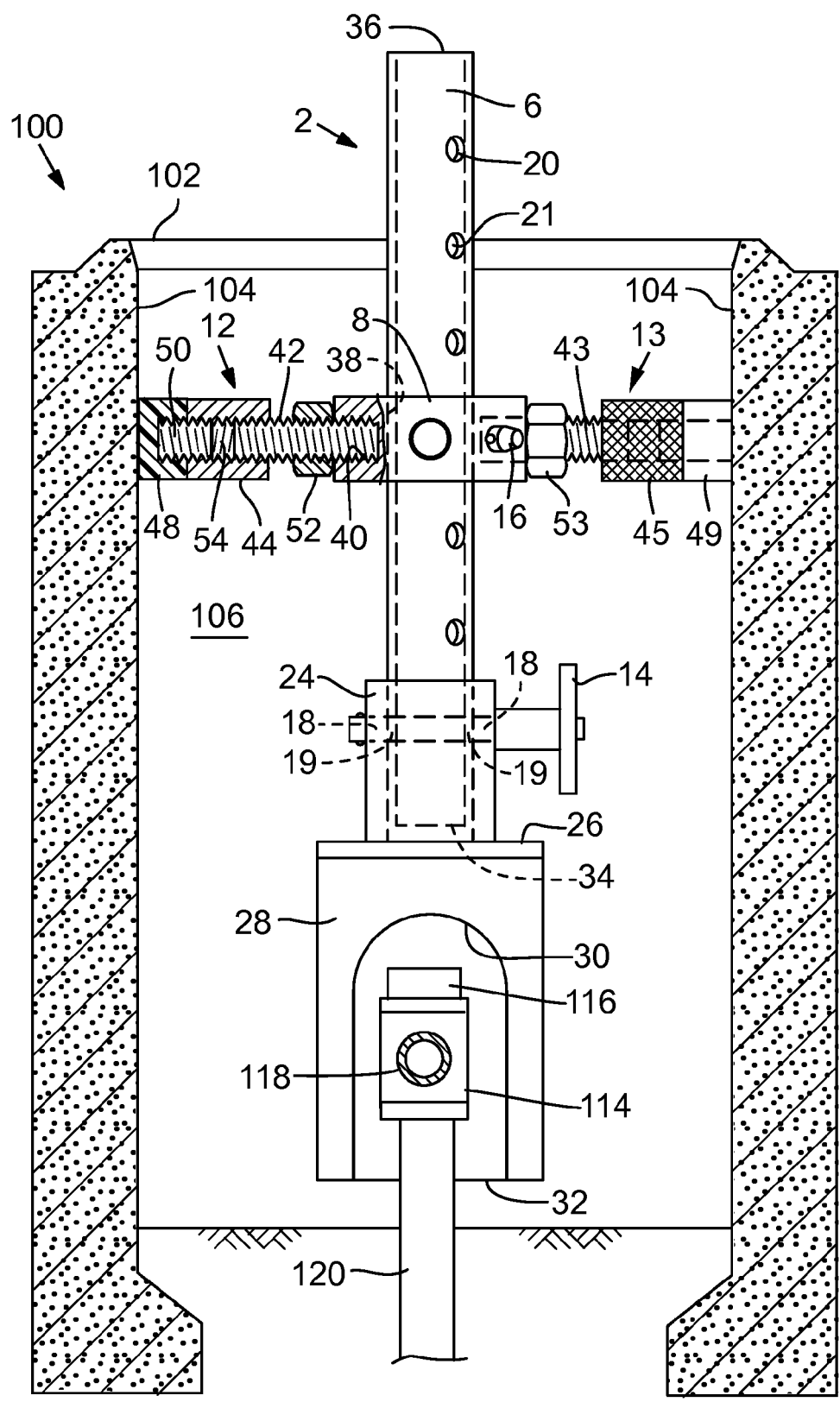

The guard 4 is configured to be positioned over and at least partially surrounding an angle meter stop 114 when the device 2 is engaged within a meter box 102 (see FIGS. 5-7). The guard 4 comprises a collar 24, a base wall 26, and a side wall 28. The collar 24 can extend upwardly from the base wall 26 and can couple the guard 4 to the support shaft 6. For example, the collar 24 can comprise a generally cylindrical body sized to receive a lower end of the shaft 6. The side wall 28 can extend downwardly from the generally horizontal base wall 26 and terminate at a lower edge 32. The side wall 28 and base wall 26 form a concavity, or internal recess, that is configured to receive the angle meter stop 114. The internal recess can be generally rectangular or various other shapes.

One side of the side wall 28 can have a cut-out portion 30, as shown in FIG. 30. The cut-out portion 30 can extend upwardly from the lower edge 32 to near the base wall 26. As shown in FIGS. 5-6, the cut-out portion 30 can be shaped to receive a horizontal conduit 118 coupling the angle meter stop 114 to the water meter 112 when the guard 4 is positioned around the angle meter stop, as shown in FIGS. 5-7.

In other embodiments, the guard 4 can have various other configurations. For example, the guard 4 can include an upper base wall without any side walls, such that the guard is positionable over the top of the angle meter stop. In other embodiments, the base wall 26 and/or the side wall 28 can be curved or rounded, such as forming a bowl shape.

The support shaft 6 can comprise an elongated, rigid body having an upper end 36 and a lower end 34 (see FIG. 6). The shaft 6 can be tubular (as shown in the illustrated embodiments) or solid, and can have any cross-sectional shape, such as circular or polygonal. The collar 24 of the guard 4 can be detachably coupled to the lower end 34 of the support shaft 6, such as by using a lower releasable locking pin 14. As shown in FIG. 6, the lower releasable locking pin 14 can extend through aligned apertures 18 in the collar 24 and apertures 19 in the shaft 6 to secure the guard 4 to the shaft.

Figure 3:
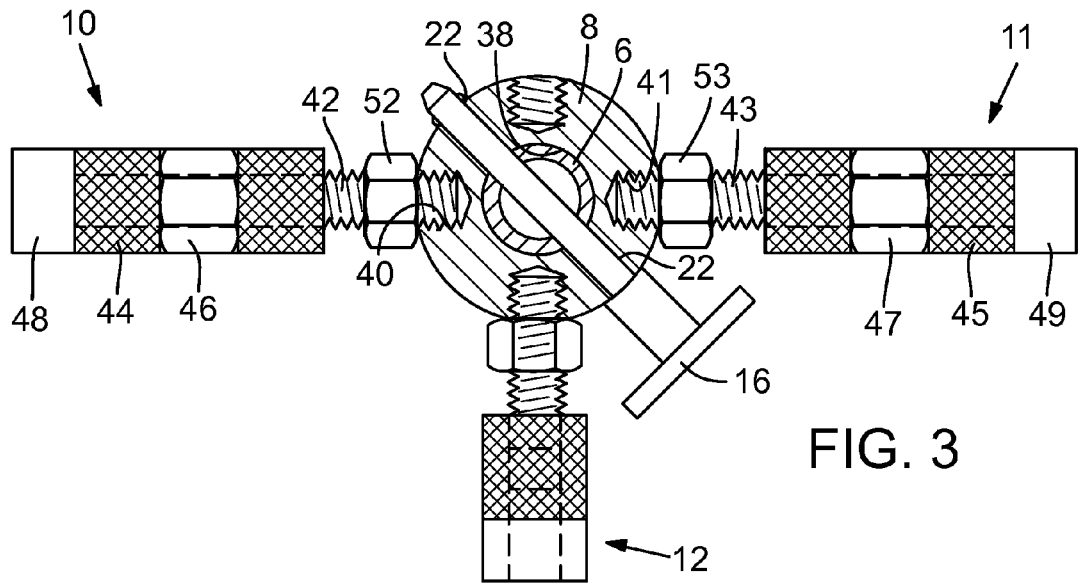
FIG. 3 is a partial cross-sectional top view of the safety device of FIG. 1 with top portions of the adapter ring and support shaft, one arm, and the guard removed.

The adapter ring 8 can be adjustably coupled to the support shaft 6 at plural longitudinal positions along the shaft between the upper end 36 and lower end 34, such as by using a releasable upper locking pin 16. As shown in FIG. 3, the upper locking pin 16 extends through aligned apertures 22 in the ring 8 and a selected pair of aligned apertures in the shaft 6 (two of which are shown as apertures 20, 21 in FIG. 1). The shaft 6 can comprise at least two pairs of aligned apertures (such as apertures 20, 21) at different longitudinal positions along the shaft such that the adapter ring 8 can be coupled to the shaft at each of the different longitudinal positions. For example, in the illustrated embodiment, the shaft 6 comprises six pairs of apertures for coupling the adapter ring to the shaft. In other embodiments, the shaft 6 can comprise only one pair or apertures such that the adapter ring 8 is not adjustable along the shaft. In other embodiments, the adapter can be fixed to the shaft 6, such as by welding, at a given longitudinal position. Likewise, in some embodiments, the guard 4 can be more permanently fixed to the lower end of the shaft 6, such as by welding or with a mechanical fastener, such that the guard is not easily removable from the shaft.

In embodiments having a tubular or cylindrical shaft 6 with a hollow internal region, the shaft can comprise a pair of lower apertures 19 (see FIG. 6) for the lower locking pin 14 and several pairs of upper apertures (such as apertures 20, 21) for the upper locking pin 16, each pair of apertures being at a different longitudinal position along the shaft 6. For a solid shaft, these apertures can comprise single bores passing through the entire shaft, rather than pairs of aligned apertures. The lower apertures 19 can be offset, such as about 45°, from the upper apertures.

The locking pins 14, 16 can comprise a manually actuated release mechanism having a button that is depressed to allow the pin to be inserted into or pulled out of the device 2. Without pressing the button, the locking pins 14, 16 are configured to not be removable from the device.

As shown in FIG. 3, the adapter ring 8 can comprise a central opening 38 that fits around the support shaft 6. The adapter ring 8 can be positioned at various locations along the shaft 6 corresponding to the positions of the apertures in the shaft. By adjusting the longitudinal position of the adapter ring 8 along the shaft 6, the longitudinal distance from the arms 10, 12 to the guard 4 can be adjusted so as to fit meter boxes of different depths and configurations. The adapter ring 8 can further comprise two or more outer openings, such as outer openings 40, 41. The outer openings can be used to couple the arms 10, 11, 12, and/or 13 to the adapter ring 8 and thereby to the shaft 6 and the guard 4.

The outer openings 40, 41 can comprise internally threaded openings for receiving externally threaded bolts, such as bolts 42, 43 of the arms 10, 11, respectively. In some embodiments, the bolts 42, 43 are removable from the adapter ring 8, such as by unscrewing the bolts from the openings 40, 41. In other embodiments, the bolts 42, 43 can be more permanently attached to the adapter ring 8, such as by welding the bolts to the ring. Locking nuts 52, 53 can also be used to secure the bolts 42, 43 to the adapter ring 8. The nuts 52, 53 can be tightened against the side of the adapter ring 8 to reduce the risk of the bolts 42, 43 coming loose from the ring 8.

Figure 4A:
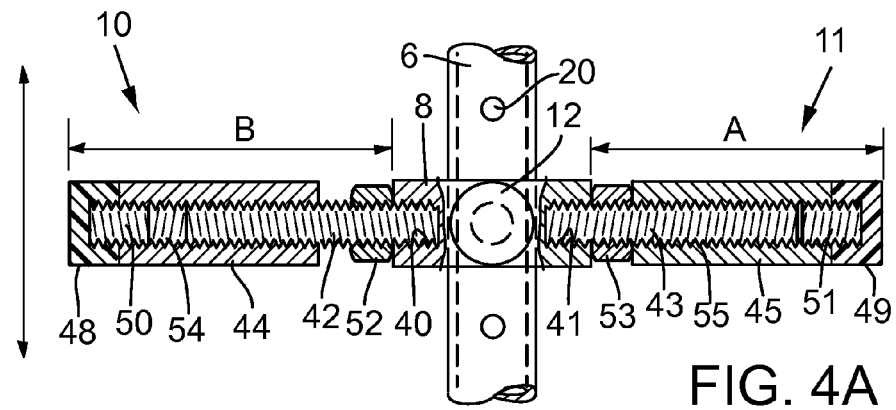
FIGS. 4A and 4B are partial cross-sectional side views of the arms, adapter ring, and a portion of the support shaft of the safety device of FIG. 1.
Figure 4B:
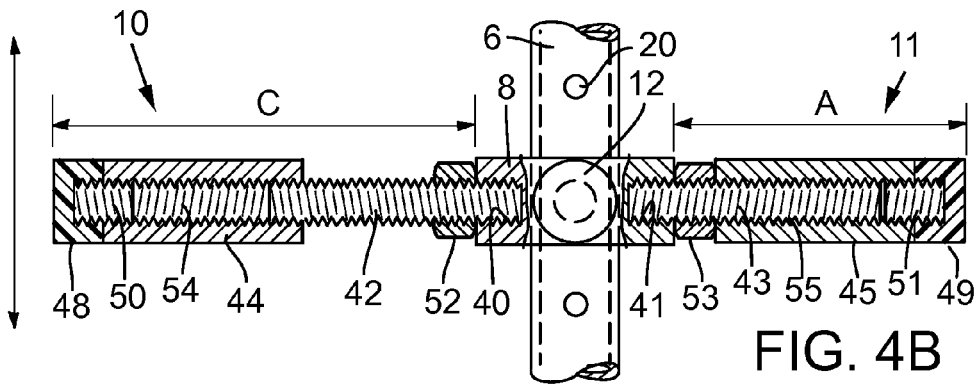

As shown in FIGS. 4A and 4B, the arms 10, 11 can comprise handles 44, 45 having internally threaded openings 54, 55 that are rotatably engaged around the bolts 42, 43 such that the distance from the ends of the arms to the shaft 6 (the wingspan of the arms) can be adjusted by rotating the handles 44, 45 about the bolts 42, 43. In other embodiments, other types of arm adjustment mechanisms can be used to allow the wingspan of the arms to be adjustable. The arms 10, 12 can also comprise engagement features on the outer surface of the handle 44, such as knurling, to provide better grip. For either the long arms 10, 11 or the short arms 12, 13, the handles 44 can also comprise a polygonal (e.g., hexagonal) portion (such as portions 46, 47) or similar feature to facilitate the use of a wrench or other tool to rotate the handles.

The arms 10, 11 can further comprise end portions 48, 49 configured to engage with walls of a water meter box to secure the device 2 within the meter box. The end portions 48, 49 can comprise a bolt or threaded portion 50, 51 that screws into the distal ends of the openings of the handles (e.g., opening 54 of the handle 44) opposite the bolt 42. The end portions 48, 49 can comprise an engagement material, such as rubber or machined steel, that is configured to provide a large coefficient of friction when engaged with the walls of a meter box, which are typically made of concrete. The outer diameter of the handles 44, 45 can be selected to allow a person to exert maximum torque by gripping them with his hands and twisting. The thread pitch of the bolt 42, 43 and the handle 44, 45 can be selected to provide a desired mechanical advantage such that a person can manually rotate the handles to create sufficient outward force against the walls of the meter box to secure the device 2 in the meter box and withstand the force of the an angle meter stop exploding upward under high water pressure against the guard.

The arms 10, 11 can have a range of adjustability along the bolts 42, 43 as shown in FIGS. 4A and 4B. The arms 10, 11 are shown in FIGS. 4A and 4B, though the arms 12, 13 can be similarly adjustable. A fully contracted position is shown at the right of FIGS. 4A and 4B, wherein the arm 11 has a minimal distance A from the adapter ring 8 to the distal contact surface of the end portion 49. In this position, the handle 45 contacts the nut 53 and/or the bolt 43 contacts the bolt 51 of the end portion 49, thereby preventing further proximal movement of the arm 11 relative to the shaft 6. A fully extended position is shown at the left of FIG. 4B, with only an end portion of the bolt 42 engaged within the handle 44. In this position, the arm 10 has a maximal distance C from the adapter ring 8 to the distal contact surface of the end portion 48. An intermediate position is shown at the left of FIG. 4A, with a distance B from the adapter ring 8 to the distal end of the arm 10. Each of the arms can be adjusted between the arm lengths A and C independent of each other. The lengths A and C are shorter for the short arms 12, 13. The distance A can be shorter if the nuts 52, 53 are not present. The range between the distances A and C can determine what sizes of meter boxes the device 2 can be used with. With wider meter boxes, the long arms 10, 11 can be used (see FIG. 6), and with narrower meter boxes, the short arms 12, 13 can be used (see FIG. 7). In some cases, the device 2 can be used with more than two arms at the same time. For example, two opposed arms 10, 11 can contact opposite side walls of the meter box while a third arm 12 can contact an end wall of the meter box. The arrangement and positioning of the arms can be selected based on the configuration of the water meter plumbing within the meter box and the dimensions of the meter box itself.

As shown in FIGS. 5-7, the water meter assembly 100 can comprise the meter box 102 and the water meter plumbing 110 positioned within the box. In particular, FIG. 5 is a partial cross-sectional side view of a water meter assembly 100 with the device 2 installed, FIG. 6 is a partial cross-sectional end view of a water meter assembly 100 with a relatively wide meter box 102 and with the device 2 installed, and FIG. 7 is a partial cross-sectional end view of a water meter assembly 100 with a relatively narrow meter box 102 and with the device 2 installed. The box 102 is typically rectangular with opposing side walls 104 and opposing end walls 106. The assembly 100 is typically partially submerged in the ground, a sidewalk, or other surrounding infrastructure, such that the upper opening of the box is accessible.

The plumbing 110 typically comprises a water meter 112, an angle meter stop 114, and other components. The angle meter stop 114 comprises a valve 116 and forms a 90° downward bend. A lower portion of the angle meter stop 114 is frictionally coupled to a downwardly extending vertical conduit 120 that communicates with a water source. The water meter 112 is positioned laterally from angle meter stop 114 and coupled to the angle meter stop with a horizontal conduit 118. The water meter 112 is further coupled to additional downstream plumbing components that communicate with a water destination. The exact shape and style of the angle meter stop 114 and other plumbing can vary significantly, and only a schematic illustration is shown in FIGS. 5-7.

As shown in FIGS. 5-7, the safety device 2 can be inserted into the meter box 102 through the upper opening and positioned such that the guard 4 is partially surrounding the angle meter stop 114. The base wall 26 can be spaced above the top of the angle meter stop 114, as shown, or the base wall can contact the top of the angle meter stop. The guard 4 can be rotationally oriented with the cut-out portion 30 of the side wall 28 is facing the water meter 112 such that the cut-out 30 is positioned around the horizontal conduit 30 when the angle meter stop 114 is within the guard 4. The guard 4 can be sized to fit a range of differently sized angle meters stops and conduit diameters. For example, the cut-out 30 can be wide enough to fit around a horizontal conduit having an outer diameter of 1.5 inches, 2 inches, or any other size. The length of the side wall 28 can be selected such that the lower edge 32 extends below the bottom of the angle meter stop 114.

Before inserting the safety device 2 into the meter box 102, however, the adapter ring 8 can be adjusted vertically along the length of the shaft 6 to a desirable position that allows the arms to be aligned with portions of the walls 104, 106 that are suitable for engagement with the arms. In addition, the valve 116 of the angle meter stop 114 can be closed prior to inserting the safety device 2.

With the guard 4 desirably positioned relative to the angle meter stop 114, the arms can be adjusted to engage with the walls 104 and/or 106 of the meter box 102. Each of the arms can be independently adjusted by rotating its respective handle about the bolt of the arm until the end portion contacts the wall of the meter box. Once the end portions of two opposing arms are in contact with the opposing walls, one or both of the handles of the opposing arms can be further rotated to increase the horizontal compression forces between the walls and the arms. The horizontal compressive force increases friction between the walls and the end portions of the arms and holds the device 2 in position within the meter box. The handles of the arms can be manually rotated or a tool can be used to rotate the handles a desired amount. The opposing arms can be aligned along a common horizontal arm axis such that the opposing compressive forces from the side walls of the box are aligned to minimize the introduction of rotational forces on the device 2.

In some embodiments, a third arm coupled to the adapter ring 8 can be adjusted to engage with and end wall 106 of the box while two opposing arms are adjusted to contact the side walls 104. FIG. 3 shows such a configuration with two opposing long arms 10, 11 and a single short arm 12 oriented at 90° to the long arms. The additional third arm can further secure the device 2 in the meter box 102. In some embodiments, a fourth arm can be included that opposes the third arm and extends to engage with the opposite end wall 106. The fourth arm can be significantly longer than the third arm and desirably shares a common arm axis with the third arm.

With the arms engaged with the walls of the meter box 102 and the guard 4 positioned over the angle meter stop 114, it can be safer to begin work on the water meter 112 and/or other portions of the plumbing 110. For example, the water meter 112 can be disconnected from the angle meter stop 114 and other plumbing elements and replaced. With the water meter 112 removed, the angle meter stop 114 can come loose from the vertical conduit 120 under high water pressure behind the valve 116. In such an incidence, the base wall 26 and side wall 28 of the guard 4 can contain the angle meter stop 114 and prevent it and the water from projecting out of the meter box and causing injury. If, for example, the base wall 26 is positioned against the top of the angle meter stop 114, the guard 4 can help hold the angle meter stop to the vertical conduit 120 and prevent it from coming loose in the first place. After work on the water meter is completed, the arms can be rotated back the other direction to loosen the end caps from the meter box walls, and the device 2 can be lifted off of the angle meter stop and out of the meter box.

The device 2 can be positioned entirely on one end of the meter box 102 (as shown in FIG. 5) to allow greater access to the water meter 112 and other plumbing elements. This can allow a worker to more easily introduce tools, hands and/or other objects into the meter box to perform the needed work on the plumbing. In some embodiments, the entire device or substantially the entire device can be positioned in one half of the meter box in the engaged configuration. In some embodiments, all or substantially all of the device 2 is located on one side of a vertical plane intersecting the horizontal conduit 118 and the water meter 112 is located on the other side of the plane. In some embodiments, a portion of the support shaft 6 extends above the uppermost surface of the meter box 102, such that the device 2 can easily be handled for inserting and removing the device. In some embodiments, the top end of the shaft 6 can comprise or be coupled to a handle.

In some embodiments, the wingspan of the arms can be fixed and not adjustable. In such embodiments, the device 2 can be inserted into the box 102 with the arms horizontally rotated from their engagement positions and then the whole device can twisted in a horizontally plane to engage the ends of the arms with the walls 102, 104 such that the device is secured in the meter box.

In some embodiments, the safety device 2, when engaged within a meter box 102, can withstand up to 100 pounds, up to 150 pounds, up to 200 pounds, or more, of upward force without dislodging from the meter box. In some embodiments, the safety device 2, when engaged within a meter box 102, can withstand the force of an angle meter stop blowing off of the vertical conduit 120 under up to 100 psi, up to 150 psi, or more, of water pressure behind the valve 116 without dislodging from the meter box. The guard 4, support shaft 6, adapter 8, arms 10, 12, and/or other parts of the device 2 can comprise steel, aluminum, and/or other rigid and strong materials.

In one specific embodiment, the side wall 28 of the guard 4 can have a wall thickness of about 0.125 inches, a height of about 5 inches, and a width of about 3.5 inches. The cut-out 30 can be about 2.375 inches wide and about 4.125 inches high. The base wall 26 can have a wall thickness of about 0.25 inches and can be about 3.5 inches by about 3.5 inches wide. The collar 24 can have an outer diameter of about 2 inches, an inner diameter of about 1.5 inches, and a height of about 2.5 inches above the base wall. The support shaft can have a height of from about 8 inches to about 16 inches, and outer diameter of about 1.3125 inches, and an inner diameter of about 1.0625 inches. The apertures 18, 19, 20, 21 and 22 can be about 0.375 inches in diameter. The apertures along the longitudinal axis of the shaft can be spaced about 1.5 inches apart, with the lowest apertures 19 being about 1.5 inches from the lower end 34 of the shaft and the highest apertures 20 being about 1.5 inches from the upper end 36 of the shaft. The adapter ring 8 can have an outer diameter of about 3 inches, a bore diameter of about 1.335 inches, and a height of about 1 inch. The openings 40, 41 can be about 0.5 inches deep and 0.625 inches wide. The bolts 42, 43 can have an outer diameter of about 0.625 inches and vary in length. For the long arms 10, 11, the bolts 42, 43 can be about 3 inches long and the handles 44, 45 can be about 3 inches long. For the short arms 12, 13 the bolts can be 1.5 inches long and the handles can be about 1.25 inches long. The nuts 52, 53 can be about 0.625 inches long, the end portions 48, 49 can be about 0.75 inches long (not including the bolt 50, 51), and both the handles and the end portions can have a diameter of about 1.25 inches. All of these dimensions can be varied and are not limiting.

With reference to FIGS. 4A and 4B, the minimum length A can be from about 4 inches to about 5 inches for the long arms 10, 11 and from about 2 inches to about 3 inches for the short arms 12, 13. The maximum length C can be from about 6 inches to about 7 inches for the long arms 10, 11, and from about 2.5 inches to about 3.5 inches for the short arms 12, 13. The overall maximum distance from the engagement surface of one end portion 48 to the engagement surface of an opposing end portion 49 can be from about 14" to about 16" with two long arms 10, 11, and from about 8" to about 10" for two short arms 12, 13. The overall minimum distance from the engagement surface of one end portion 48 to the engagement surface of an opposing end portion 49 can be from about 11" to about 13" with two long arms 10, 11, and from about 7" to about 9" for two short arms 12, 13. These lengths can be varied by adjusting the length of the bolts 42, 43, the lengths of the handles 44, 45, and/or the dimensions of other portions of the arms 10, 11, 12, 13, the adapter ring 8, the shaft 6, the nuts 52, 53, and the end portions 48, 49. The vertical position and spacing of the adapter ring apertures 20, 21 can also be adjusted in different embodiments. Thus, safety devices described herein can be adjusted to be used with any size meter box and can be used with various shapes and sizes of angle meter stops, plumbing conduits, and other plumbing components, to provide increased safety when working on the plumbing within the meter box.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

As used herein, the terms "a", "an" and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A," "B," "C," "A and B," "A and C," "B and C" or "A, B and C."

As used herein, the term "coupled" generally means physically connected or linked and does not exclude the presence of intermediate elements between the coupled items absent specific contrary language.

In view of the many possible embodiments to which the principles of the disclosure may be applied, it should be recognized that the illustrated embodiments are only preferred examples and should not be taken as limiting the scope of the disclosure. Rather, the scope of the disclosure is defined by the following claims. We therefore claim all that comes within the scope of these claims.

We claim:

1. A safety device for use with a water meter assembly, the water meter assembly comprising plumbing positioned within a meter box, the plumbing comprising an angle meter stop coupled to a water meter, the safety device comprising:
    a support shaft having a first end, a second end, and a longitudinal axis extending from the first end to the second end;
    a guard coupled to the first end of the support shaft and comprising a wall structure configured to partially surround the angle meter stop; and
    two arms coupled to the support shaft between the first end and the second end, the arms configured to adjustably engage walls of the meter box to secure the safety device within the meter box with the guard partially surrounding the angle meter stop such that motion of the guard relative to the arms is prevented in both directions along the longitudinal axis of the support shaft and the guard is retained partially surrounding the angle meter stop.

2. The device of claim 1, wherein the two arms each comprise an engagement end configured to engage with the walls of the meter box, and wherein each of the two arms is adjustable relative to the support shaft such that the distance from the engagement end to the support shaft is adjustable.

3. The device of claim 2, wherein, for at least one of the two arms, the distance from the engagement end of the arm to the support shaft is adjustable by rotating the arm.

4. The device of claim 3, wherein at least one of the two arms comprises an outer portion having an internally threaded central opening engaged with an externally threaded bolt having a first end adjustably engaged within the central opening and a second end coupled to the support shaft.

5. The device of claim 4, wherein at least one of the arms further comprises a locking nut engaged around the bolt between the outer portion of the arm and the support shaft, the locking nut configured to secure the arm in a given configuration relative to the support shaft.

6. The device of claim 1, wherein the support shaft extends along the longitudinal axis between the first and second ends, and wherein the two arms extend in respective opposite directions from adjacent the support shaft along a common arm axis that is perpendicular to the longitudinal axis of the support shaft, the arms being configured to engage with opposing side walls of the meter box that are generally perpendicular with the common arm axis.

7. The device of claim 1, wherein the arms are adjustably couplable to the support shaft at plural different fixed locations along the longitudinal axis of the support shaft, such that a longitudinal distance from the guard to the arms is adjustable.

8. The device of claim 1, further comprising an adapter ring that is adjustably securable to the support shaft at plural longitudinal positions along the support shaft and configured to couple the arms to the support shaft.

9. The device of claim 1, wherein the guard wall structure comprises a base wall coupled to the support shaft and a side wall extending from the base wall, the base wall and side wall defining a central recess having an open side opposite the base wall, the side wall comprising a cutout portion adjacent the open side.

10. The device of claim 1, wherein the arms are selectively fixed to the support shaft along the longitudinal axis of the support shaft.

11. A method of installing a safety device in a water meter assembly, the water meter assembly comprising an angle meter stop positioned within a meter box, the method comprising:
positioning a guard portion of the safety device over the angle meter stop;
engaging arms of the safety device with walls of the meter box to secure the safety device relative to the water meter assembly and prevent the guard portion from uncovering the angle meter stop; and
adjusting a position of the arms relative to the guard portion between a plurality of different fixed positions along a shaft axis that is perpendicular to longitudinal axes of the arms.

12. The method of claim 11, wherein engaging the arms of the safety device with walls of the meter box comprises rotating the arms about their longitudinal axes.

13. The method of claim 12, wherein rotating the arms causes the arms to move apart from each other and contact opposing side walls of the meter box.

14. The method of claim 11, further comprising selecting the arms from a set of arms having different lengths, the length of the selected arms being based on an internal width of the meter box.

15. The method of claim 11, wherein positioning the guard portion over the angle meter stop comprises positioning a notch in a sidewall of the guard portion over a horizontal conduit coupling the angle meter stop to a water meter.

16. The method of claim 11, wherein the safety device, when installed in the water meter assembly, allows access to a water meter coupled to the angle meter stop within the meter box, such that the water meter can be disconnected from the angle meter stop while the safety device is installed.

17. The method of claim 16, further comprising:
performing maintenance on the water meter assembly with the safety device installed;
disengaging the arms from the meter box by rotating the arms about their longitudinal axes; and
removing the guard from the angle meter stop.

18. A safety device for use with a water meter assembly, the water meter assembly comprising plumbing positioned within a meter box, the plumbing comprising an angle meter stop coupled to a water meter, the safety device comprising:
a guard configured to partially surround the angle meter stop;
a support shaft having a longitudinal axis extending between a first end and a second end of the support shaft, wherein the first end of the support shaft is coupled to the guard; and
two arms coupled to the support shaft and configured to engage with the meter box to secure the safety device within the water meter box with the guard partially surrounding the angle meter stop, wherein the guard, the support shaft, and the two arms are coupled in such a manner so that rotational motion of the guard relative to the arms about the longitudinal axis of the support shaft is restricted.

19. The safety device of claim 18, wherein the support shaft is fixed relative to the arms.

20. The safety device of claim 18, wherein the arms are coupled to the support shaft such that the arms can be adjusted to any one of a plurality of fixed locations along the longitudinal axis of the support shaft.

* * * * *